US008868858B2

(12) United States Patent
Atluri

(10) Patent No.: US 8,868,858 B2
(45) Date of Patent: Oct. 21, 2014

(54) METHOD AND APPARATUS OF CONTINUOUS DATA BACKUP AND ACCESS USING VIRTUAL MACHINES

(75) Inventor: Rajeev Atluri, Corona, CA (US)

(73) Assignee: Inmage Systems, Inc., Santa Clara, CA (US)

( * ) Notice: Subject to any disclaimer, the term of this patent is extended or adjusted under 35 U.S.C. 154(b) by 175 days.

(21) Appl. No.: 11/438,036

(22) Filed: May 19, 2006

(65) Prior Publication Data

US 2007/0271428 A1    Nov. 22, 2007

(51) Int. Cl.
G06F 12/00 (2006.01)
G06F 13/00 (2006.01)
G06F 13/28 (2006.01)
G06F 11/14 (2006.01)

(52) U.S. Cl.
CPC ........ *G06F 11/1464* (2013.01); *G06F 11/1469* (2013.01); *G06F 11/1461* (2013.01); *G06F 11/1451* (2013.01)
USPC .......................................... 711/162; 711/161

(58) Field of Classification Search
CPC .............. G06F 2201/815; G06F 3/065; G06F 9/45558; G06F 3/067; G06F 11/1456; G06F 9/45533; G06F 11/1458; G06F 11/1469; G06F 11/1484; G06F 2009/4557
USPC ..................... 711/6, 161–162, 202–203, 209; 707/204
See application file for complete search history.

(56) References Cited

U.S. PATENT DOCUMENTS

| 5,193,181 | A | 3/1993 | Barlow et al. |
| 5,313,612 | A | 5/1994 | Satoh et al. |
| 5,446,871 | A | 8/1995 | Shomler et al. |
| 5,621,882 | A | 4/1997 | Kakuta |
| 5,664,189 | A | 9/1997 | Wilcox et al. |
| 5,805,785 | A | 9/1998 | Dias et al. |
| 5,875,479 | A | 2/1999 | Blount et al. |
| 5,930,824 | A | 7/1999 | Anglin et al. |
| 6,175,932 | B1 | 1/2001 | Foote et al. |
| 6,247,141 | B1 | 6/2001 | Homberg |

(Continued)

FOREIGN PATENT DOCUMENTS

WO    WO-2004021677 A1    3/2004

OTHER PUBLICATIONS

Neel, D., "Symantec Says It'll Put Data on Road to Recovery—New LiveState Une Promises Complete System Restoration," Computer Reseller News, Oct. 4, 2004, 12.

(Continued)

*Primary Examiner* — Yaima Rigol
(74) *Attorney, Agent, or Firm* — Raj Abhyanker, P.C.

(57) ABSTRACT

A continuous data backup and access method/system using virtual machines is disclosed. In one embodiment, a method includes creating a virtual machine associated with a backup module based on attributes of an application server when the application server is connected to a network having the backup module, continuously capturing any change of a data processed in the application server, and automatically backing up the any change of the data in a storage device coupled to the backup module using the virtual machine, and communicating at least the data in the storage device to the application server using the virtual machine when a command is communicated to the backup module. The method may also include automatically recovering a recent attribute and data of the application sever using the virtual machine associated with the backup module when the application sever fails.

20 Claims, 10 Drawing Sheets

(56) References Cited

U.S. PATENT DOCUMENTS

| | | |
|---|---|---|
| 6,269,431 B1 | 7/2001 | Dunham |
| 6,324,654 B1 | 11/2001 | Wahl et al. |
| 6,327,579 B1 | 12/2001 | Crawford |
| 6,490,691 B1 | 12/2002 | Kimura et al. |
| 6,647,399 B2 | 11/2003 | Zaremba |
| 6,691,140 B1 | 2/2004 | Bogrett |
| 6,714,980 B1 | 3/2004 | Markson et al. |
| 6,742,139 B1 | 5/2004 | Forsman et al. |
| 6,785,786 B1* | 8/2004 | Gold et al. ............. 711/162 |
| 6,833,073 B2 | 12/2004 | Agarwal |
| 6,915,315 B2 | 7/2005 | Autrey et al. |
| 6,981,177 B2 | 12/2005 | Beattie |
| 7,093,086 B1* | 8/2006 | van Rietschote ............. 711/161 |
| 7,155,586 B1 | 12/2006 | Wagner et al. |
| 7,165,156 B1 | 1/2007 | Cameron et al. |
| 7,171,511 B2* | 1/2007 | Yagawa ............. 711/100 |
| 7,206,911 B2 | 4/2007 | Wolfgang et al. |
| 7,237,021 B2 | 6/2007 | Penny et al. |
| 7,251,749 B1 | 7/2007 | Fong et al. |
| 7,254,682 B1 | 8/2007 | Arbon |
| 7,577,689 B1* | 8/2009 | Masinter et al. ............. 1/1 |
| 2002/0008795 A1 | 1/2002 | Koyama et al. |
| 2002/0124013 A1 | 9/2002 | Loy et al. |
| 2003/0093579 A1 | 5/2003 | Zimmer et al. |
| 2004/0031030 A1 | 2/2004 | Kidder et al. |
| 2004/0093474 A1 | 5/2004 | Lin et al. |
| 2004/0172574 A1* | 9/2004 | Wing et al. ............. 714/4 |
| 2004/0199515 A1 | 10/2004 | Penny et al. |
| 2004/0205390 A1 | 10/2004 | Kanevsky et al. |
| 2005/0010835 A1 | 1/2005 | Childs et al. |
| 2005/0033930 A1 | 2/2005 | Haruma et al. |
| 2005/0044162 A1 | 2/2005 | Liang et al. |
| 2005/0050386 A1 | 3/2005 | Reinhardt et al. |
| 2005/0055603 A1 | 3/2005 | Soran et al. |
| 2005/0125513 A1* | 6/2005 | Sin-Ling Lam et al. ...... 709/220 |
| 2005/0138090 A1 | 6/2005 | Augenstein et al. |
| 2005/0138204 A1 | 6/2005 | Iyer et al. |
| 2005/0182953 A1 | 8/2005 | Stager et al. |
| 2005/0188256 A1 | 8/2005 | Stager et al. |
| 2005/0195660 A1* | 9/2005 | Kavuri et al. ............. 365/189.05 |
| 2005/0198303 A1* | 9/2005 | Knauerhase et al. ......... 709/227 |
| 2005/0216527 A1* | 9/2005 | Erlingsson ............. 707/202 |
| 2005/0223181 A1 | 10/2005 | Jeppsen et al. |
| 2005/0240792 A1 | 10/2005 | Sicola et al. |
| 2005/0246311 A1* | 11/2005 | Whelan et al. ............. 707/1 |
| 2005/0251540 A1 | 11/2005 | Sim-Tang |
| 2005/0257085 A1 | 11/2005 | Haustein et al. |
| 2005/0262097 A1 | 11/2005 | Sim-Tang et al. |
| 2005/0262377 A1* | 11/2005 | Sim-Tang ............. 714/1 |
| 2005/0267920 A1 | 12/2005 | Helliker et al. |
| 2006/0031468 A1 | 2/2006 | Atluri et al. |
| 2006/0047714 A1 | 3/2006 | Anderson et al. |
| 2006/0114497 A1 | 6/2006 | Anderson et al. |
| 2006/0149793 A1 | 7/2006 | Kushwah et al. |
| 2006/0155674 A1* | 7/2006 | Traut et al. ............. 707/2 |
| 2006/0155912 A1* | 7/2006 | Singh et al. ............. 711/6 |
| 2006/0218434 A1 | 9/2006 | Solhjell |
| 2007/0038998 A1* | 2/2007 | Fries ............. 718/1 |
| 2007/0168404 A1 | 7/2007 | Nakamura et al. |
| 2007/0244938 A1* | 10/2007 | Michael et al. ............. 707/204 |

OTHER PUBLICATIONS

Kador, J., Open Middleware: The Next Generation in Distributed Computing, MIDRANGE Systems, Nov. 25, 1994, v.7, n.22, p. S12(4).

Data Protection—Perform Zero Downtime Backups [ online Jan. 29, 2009]. Retrieved from the Internet URL:http://stage.hp.resource.com/sbso/bus_protect/data_protect/zero_downtime.

HP Open View Storage Data Protector 5.1 Software [online] [retrieved on Jan. 29, 2009]. Retrieved from the Internet URL:http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL:http://www.rmwtug.org/Talks/ShadowStor/ShadowProtectdsheet.pdf.

U.S. Appl. No. 11/405,236, filed Oct. 18, 2007, Michael et al.
U.S. Appl. No. 11/438,401, filed Dec. 6, 2007, Atluri et al.
U.S. Appl. No. 11/438,036, filed Nov. 22, 2007, Atluri.
U.S. Appl. No. 11/229,289, filed Jan. 12, 2006, Atluri.

* cited by examiner

METHOD AND APPARATUS OF CONTINUOUS DATA BACKUP AND ACCESS USING VIRTUAL MACHINES

FIELD OF TECHNOLOGY

This disclosure relates generally to the technical fields of software and/or hardware technology and, in one example embodiment, to a continuous data backup and access method/system using virtual machines.

BACKGROUND

An application server may be configured with an operating system (e.g., Microsoft® Windows®) and a file system (e.g., FAT) compatible with a particular enterprise application (e.g., an enterprise software application such as Oracle®, FoundationIP®, etc.). The particular enterprise application may operate only when the operating system and the file system match a requirement of the particular enterprise application. Different enterprise applications may require different operating systems (e.g., Apple® Macintosh® Operating System) and different file systems (e.g., Apple® Finder).

An administrator (e.g., a network administrator) may install the particular enterprise application on the application server (e.g. a data processing system) to isolate the particular enterprise application and its configuration from the different enterprise applications in a network (e.g., a local area network, a wide area network, etc.). Alternatively, the administrator may install multiple enterprise applications on the application server.

The network may include a back-up server communicatively coupled to the application server and/or other application servers. The back-up server may prevent a loss of data when the application server fails by having substitute copies (e.g., back-up copies) of the data of the application server. However, the back-up server may be slow and/or have limitations. For example, a policy (e.g., such as Sarbanes Oxley legislation and/or an internal corporate policy) may specify a response time to a certain application level and/or file level inquiry for data associated with the particular enterprise application (e.g., a four-month old email correspondence deleted within minutes of receipt).

When the application server fails and/or is disabled, the back-up server may not be able provide data to comply with the policy. For example, the back-up server may not store manipulated data (e.g., changed, modified, added and/or deleted) between each scheduled backup. If the scheduled backup is performed at small intervals, a storage space to store data may be huge and/or expensive (e.g., may be costly to purchase, manage, and maintain).

Even if the back-up server is able to comply with the policy when the application server fails and/or is disabled, the back-up server may not have the operating system and/or the file system compatible with the particular enterprise application (e.g., necessary to retrieve, recover, and/or restore). The administrator may need to recreate (e.g., retrieve, recover, restore, etc.) application level and/or file system level data to comply with the policy. The administrator may have to perform a number of frustrating, time consuming, and expensive tasks (e.g., installing the operating system and/or the file system, installing the particular enterprise application, searching for data, retrieving the data, verifying the data, etc.) to respond to requested application level and/or file system level data.

SUMMARY

A continuous data backup and access method/system using virtual machines is disclosed. In one aspect, a method includes creating a virtual machine associated with a backup module based on attributes (e.g., an application type, an operating system type, and/or a file system type, etc.) of an application server (e.g., having applications and/or operating systems based on a physical machine and/or virtual machines) when the application server is connected to a network having the backup module. The virtual machine may be created using a transparent virtualization (e.g., does not involve a substantial modification of the operating system). Alternatively, the virtual machine may be created using a para-virtualization (e.g., requires the substantial modification of the operating system).

Then, the method may include continuously capturing (e.g., which may take place in the application server, a controller of a storage subsystem coupled to the application server, and/or a backup server coupled to the network) any change of a data (e.g., any one of a first instance of the data and subsequent changes to the data) processed in the application server, and automatically backing up the any change of the data in a storage device coupled to the backup module using the virtual machine and/or directly through the backup device. The method may then communicate at least the data in the storage device to the application server using the virtual machine when a command is communicated to the backup module.

The method may also include modifying the change of the data to a format of the virtual machine before automatically backing up the change of the data in the storage device, and automatically recovering a recent attribute and/or data of the application server using the virtual machine associated with the backup module when the application server fails. The method may further include automatically retrieving a past instance of the data, automatically restoring to a past instance of the application server described, and/or automatically purging (e.g., a policy module may generate a signal data to initiate the purging when a period since the recent modification of the data exceeds a threshold value) the data described by a meta-data using the virtual machine associated with the backup module when a command based on the meta-data is communicated to the backup module. Moreover, the method may include storing the attributes of the application server to a virtual machine library of the backup module when the application server is connected to the network.

In another aspect, a network system of servers includes an application server to process any change of a data, and a backup server coupled to the application server via a network to continuously back up any change of the data in a storage device coupled to the backup server using a virtual machine of the backup server. The network system may further include a capture module continuously capturing any change of the data located in the application server, the backup server, and/or a controller device of a storage array network (SAN) system coupled to the application server.

In yet another aspect, a backup device includes a virtual machine (VM) creator module to generate a command to create a virtual machine mirroring an operating system and an application of an application server when the application server is coupled to the backup device, a capture module to collect any change of a data processed in the application server and communicate the any change of the data to the backup device, a VM access module to match the virtual machine which corresponds to the operating system and the application of the application server when an identification data associated with the application server is communicated to the backup device, and a journal module to continuously copy the any change of the data to a storage device coupled to the backup device using the virtual machine.

The backup device may further include a modification module to perform a retrieval operation, a restore operation, a disaster recovery operation, and/or a deletion operation associated with the data and the application server, a VM module to provide the operating system and the application of the application server using a software algorithm, and/or a DR module to automatically recover the application and the operating system of the application server using the VM module when the application server is shut down.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

This disclosure relates generally to the technical fields of software and/or hardware technology and, in one example embodiment, to a continuous data backup and access method/system using virtual machines.

Other features of the present embodiments will be apparent from the accompanying drawings and from the detailed description that follows.

DETAILED DESCRIPTION

A continuous data backup and access method/system using virtual machines is disclosed. In the following description, for purposes of explanation, numerous specific details are set forth in order to provide a thorough understanding of the various embodiments. It will be evident, however, to one skilled in the art that the various embodiments may be practiced without these specific details.

Figure 2:
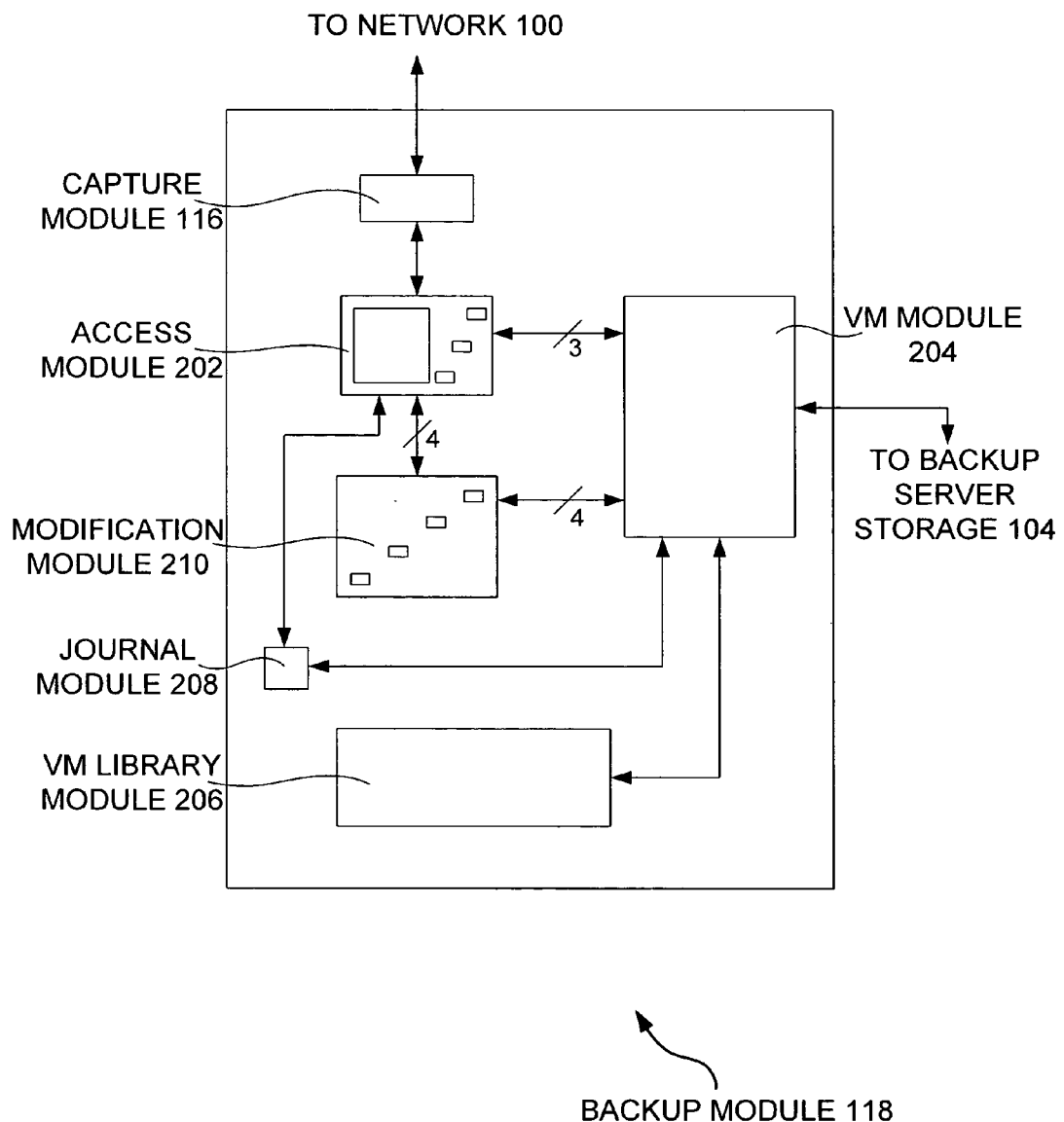
FIG. 2 is a modular diagram of the backup module in the backup server of FIG. 1, according to one embodiment.
Figure 3:
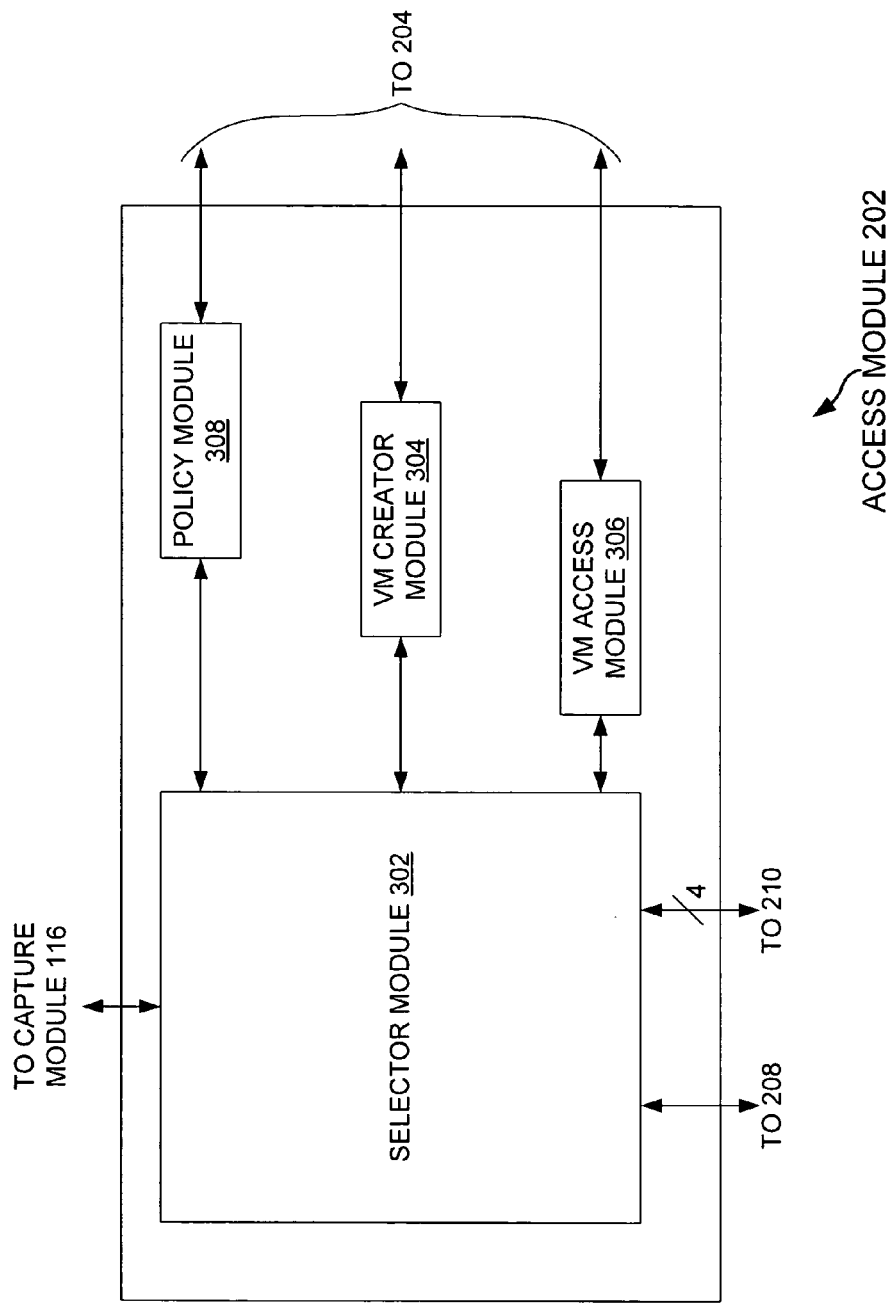
FIG. 3 is a modular view of the access module with a selector module determining a task based on a signal data communicated through the capture module of FIG. 1, according to one embodiment.
Figure 4:
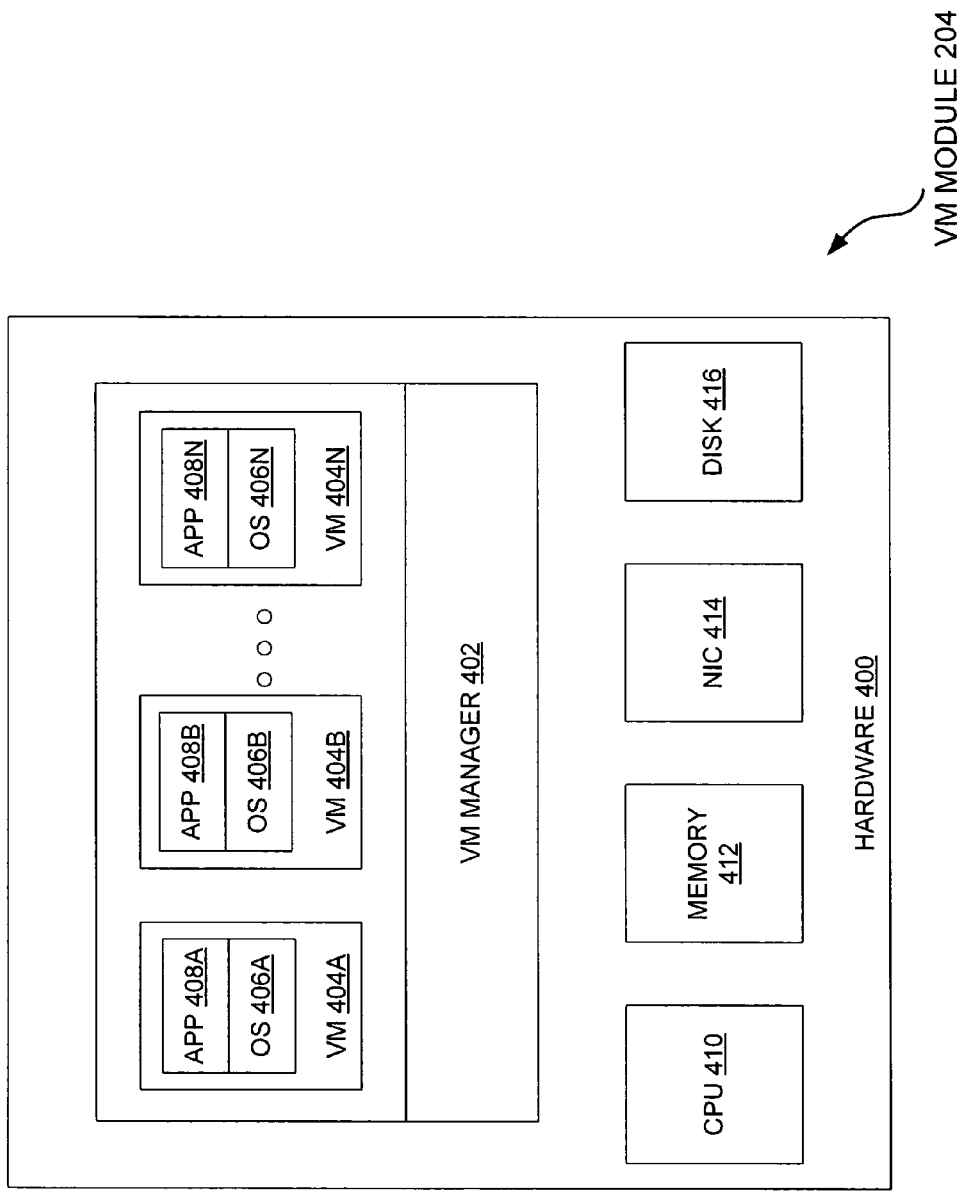
FIG. 4 is a modular view of the VM module of FIG. 2 having a VM manager, according to one embodiment.
Figure 6:
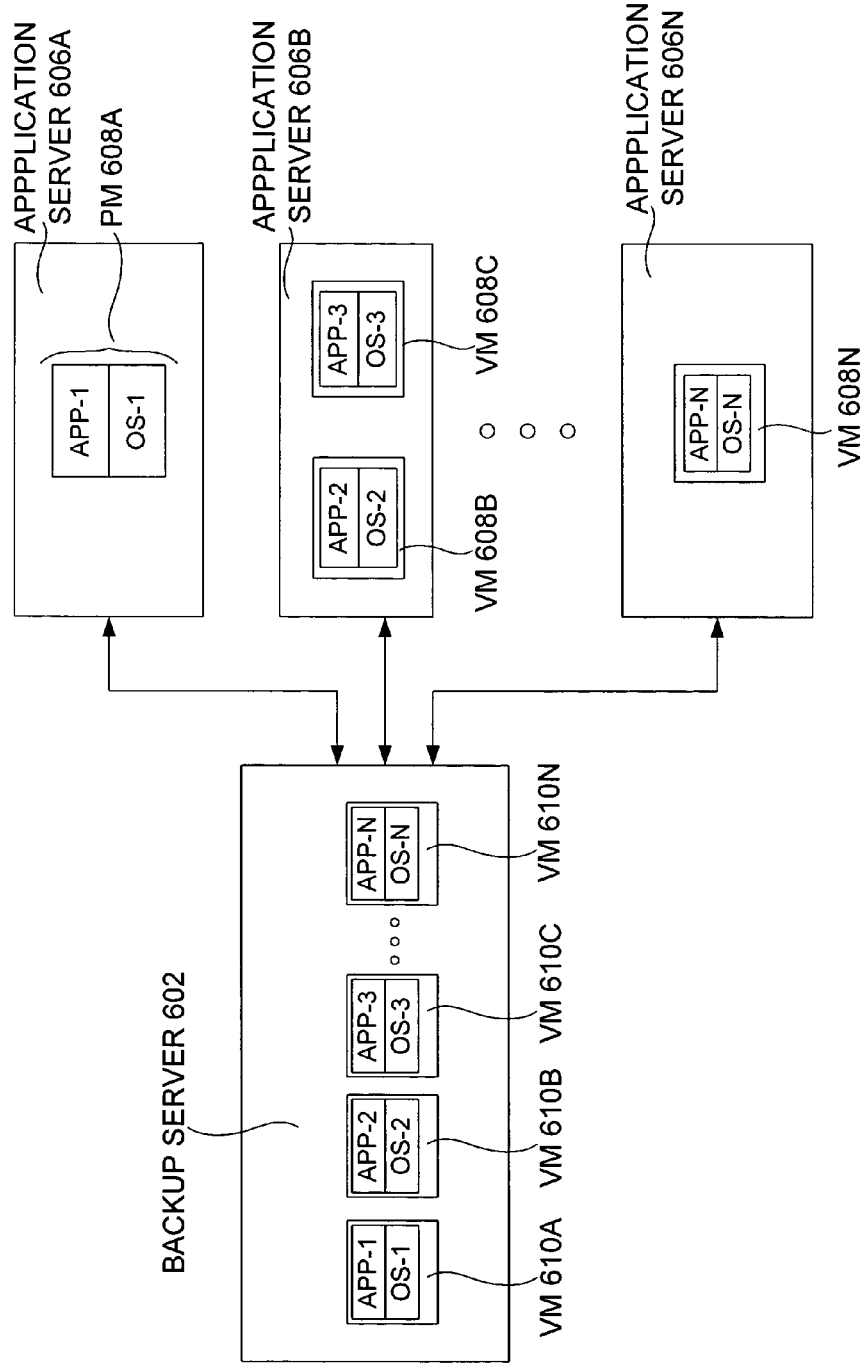
FIG. 6 is a block diagram of a backup server having a plurality of virtual machines connected to a plurality of application servers, according to one embodiment.

In one embodiment, as illustrated in FIG. 2 and FIG. 3, an apparatus includes a virtual machine (VM) creator module to generate a command to create a virtual machine (e.g., as illustrated in FIG. 4) mirroring an operating system and an application of an application server (e.g., as illustrated in FIG. 6) when the application server is coupled to the backup device, a capture module to collect any change of a data processed in the application server and communicate the any change of the data to the backup device, a VM access module to match the virtual machine which corresponds to the operating system and the application of the application server when an identification data associated with the application server is communicated to the backup device, and a journal module to continuously copy the any change of the data to a storage device coupled to the backup device using the virtual machine and/or directly through the backup device.

Figure 1:
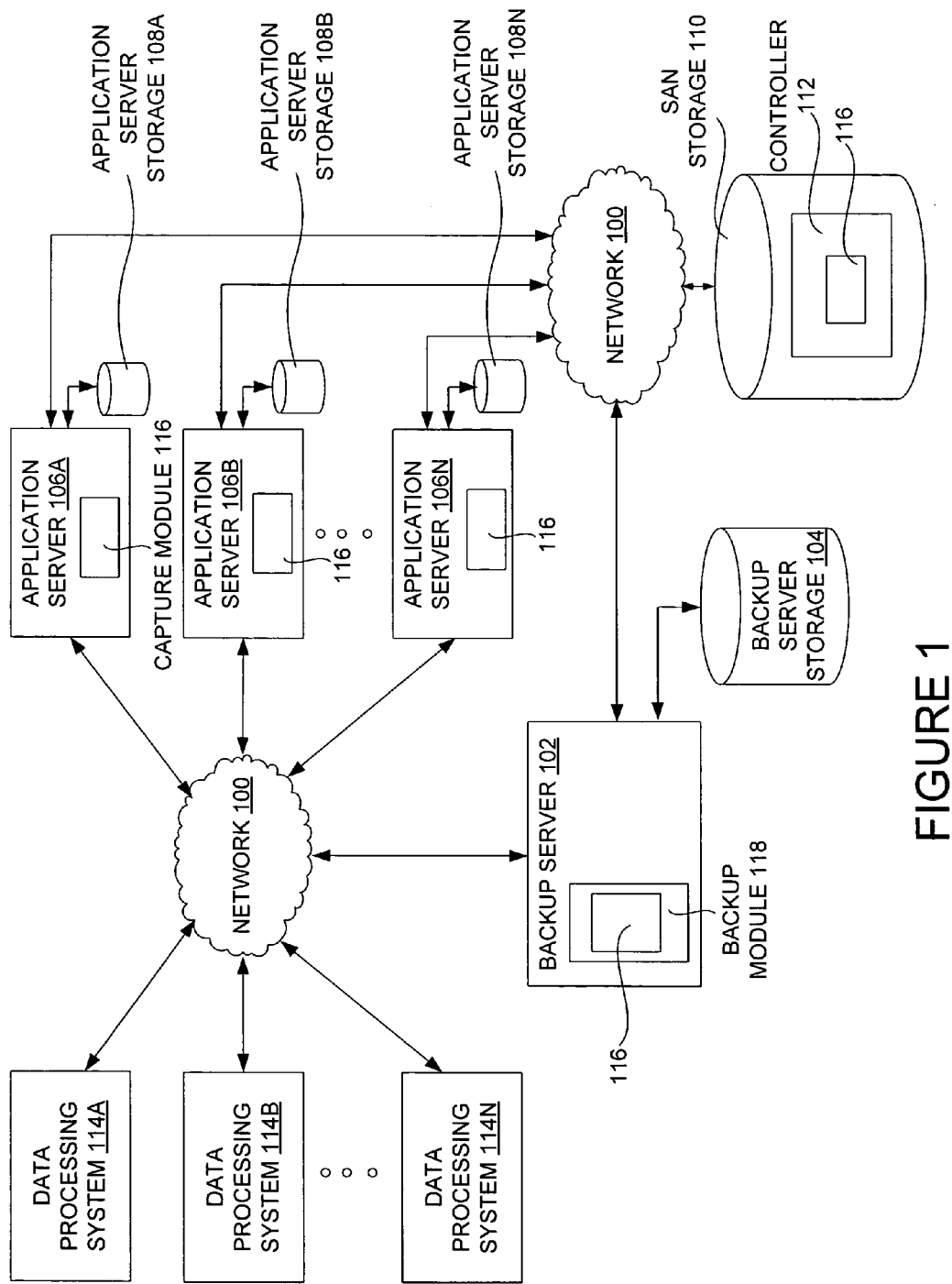
FIG. 1 is a network enabled view of a backup module of a backup server connected to a plurality of application servers, according to one embodiment.

In another embodiment, a network system of servers (e.g., as illustrated in FIG. 1) includes an application server to process any change of a data and a backup server coupled to the application server via a network to continuously back up the any change of the data in a storage device (e.g., a backup server storage 104 of FIG. 1) coupled to the backup server using a virtual machine of the backup server. In yet another embodiment, a method, as illustrated by FIGS. 2-6, includes creating a virtual machine associated with a backup module based on attributes of an application server when the application server is coupled to a network having the backup module, continuously capturing any change of a data processed in the application server and automatically backing up the any change of the data in a storage device coupled to the backup module using the virtual machine, and communicating at least the data in the storage device to the application server using the virtual machine when a command is communicated to the backup module.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein.

FIG. 1 is a network enabled view of a backup module 118 of a backup server 102 connected to a plurality of application servers 106, according to one embodiment. In FIG. 1, the backup server 102 having the backup module 118 is connected to a network 100 (e.g., internet, WAN, LAN, SAN, etc.). The backup module (e.g., in software and/or hardware) manages a communication (e.g., reading, writing, modifying of data) via the network 100 between the application servers 106 and a backup server storage 104 attached to the backup server 102. In one example embodiment, the application server 106 may issue (e.g., write, retrieve, etc.) a request (e.g., using a meta-data) for blocks (e.g., segments) of data to and/or from the backup server storage. Here, the backup server storage 104 may act in a similar fashion to an internal drive, accessing the blocks and sending response across the network 100.

In another example embodiment, the application server 106 may issue a request (e.g., using a meta-data) for a data file as a part of a larger file system which may be managed by the backup module 118 of the backup server 102. The backup module 118 may then determine a physical location of the data file, access the data file on one of internal drives of the backup server storage 104 attached to the backup module 118, and communicate (e.g., send) the data file to the application server 106 via the network 100.

The application server 106 may operate an application (e.g., FoundationIP®, Hotmail®, Citibank®, File/Print®, Orbitz®, etc.) based on an operating system (e.g., Win XP®, Win 2000®, Linux®, Novell®, etc.). The operating system may be a program that manages a relationship between the application and a number of hardware that are connected to the application server 106. The operating system may provide a variety of services (e.g., disk access, memory management, task scheduling, access to other hardware services, etc.).

The operating system may also be equipped with tools for programs to display and manage a user interface as well as utility programs to manage files and configure the operating system. For example, the operating system may provide a file system which may be a method for storing and organizing computer files and data as well as a method for accessing the files and data. A user (e.g., using a data processing system 114 such as a desktop, a laptop, a Blackberry®, etc.) of the application may access the application via the network 100.

An application server storage 108 may be a direct access storage device (e.g., floppy disk, hard disk, magnetic disk, optical disk, CD-ROM, DVD, etc.) which may permanently (e.g., in a non-volatile manner) store data mechanically, magnetically, and/or optically. The data may be also stored in a storage area network (SAN) storage 110 via the network 100 (e.g., SAN, etc.). A controller 112 (e.g., a plurality of disk array controller, etc.) of a the SAN storage 110 which attaches to the application server 106 via the network 100 may be attached to a number of disk drives in disk enclosures which are organized into RAID (e.g., redundant array of independent disks which uses multiple drives to share and/or replicate data among the drives for increased data integrity, fault-tolerance, and/or throughput compared to single drives) sets for data protection and performance reasons.

The controller 112 may also provide other services in addition to the RAID. The services may include read cache, write cache and/or copy services such as Flash Copy and Peer to Peer Remote Copy (PPRC). The controller 112 may be attached to the application server 106 using a number of different methods including a SCSI command protocol over a Fibre Channel (FC) link, a SAN over either an IP Network (iSCSI) or FC, and/or the SCSI command protocol over a serial bus such as Serial Attached SCSI.

A capture module 116 of the backup module 118 may be used to continuously capture (e.g., to store for a later use) any change of a data processed in the application server 106 (e.g., via the application). The change of the data may include any one of a first instance of the data (e.g., the data saved when the user first created a file, folder, etc.) and subsequent changes (e.g., based on a write operation and/or a delete operation) to the data. The capture module 116 may be located (e.g., installed) in the application server 106, the backup module 118 of the backup server 102, and/or the controller 112 of the SAN storage 110. When capturing of the data takes place in the application server 106 and/or the controller 112 of the SAN storage 110, the data may be communicated to the backup module 118 of the backup server 102 via the network 100 which backs up the data in the backup server storage 104. When capturing of the data takes place in the backup module 118 of the backup server 102, the data will be communicated directly to the backup server storage 104.

FIG. 2 is a modular diagram of the backup module 118 in the backup server 102 of FIG. 1, according to one embodiment. The backup module 118 includes a capture module 116 of FIG. 1, an access module 202, a virtual machine (VM) module 204, a VM library module 206, a journal module 208, and a modification module 210. The capture module 116 of FIG. 1 (e.g., of the backup module 118, the application server 106, and/or the backup server 102) may be used to capture (e.g., acquire) a change of a data (e.g., in text, images, audio and video) in their original format. Once captured, the change of the data are typically edited and converted into another format in the journal module 208.

The access module 202, as will be illustrated in more details in FIG. 3, may include a number of sub-modules (e.g., a selector module 302, a VM creator module 304, a VM access module 306, and a policy module of FIG. 3) to provide an access to the VM module 204 when a command (e.g., data and/or a meta-data) is communicated to the access module 202. The VM module 204 may be used to create and manage a plurality of virtual machines used in various operations of the backup module 118, as will be illustrated in FIG. 4. In one example embodiment, the virtual machines may be created using a software algorithm (e.g., which may be already available on the market such as VM Ware®, Xen®, etc.).

The VM library module 206 may be used to store attributes (e.g., an application, an operating system, etc.) of the application server 106 when the application server 106 is connected to the network 100 (e.g., at least once at the time of the connection). In one example embodiment, the VM library module 206 may be a software program to manage a storage device (e.g., the backup server storage 104 of FIG. 1) that handles multiple units of media and/or to provide one or more drives for reading and writing the application and operating system.

The journal module 208 may be used to continuously copy (e.g., synchronously and/or asynchronously) the any change of the data to a storage device (e.g., the backup server storage 104) coupled to the backup module 118. The journal module 208 may also modify the any change of the data to a format (e.g., a format of the operating system, file system, application, and/or other attributes) of the virtual machine before backing up in the storage device. The modification module 210 may be used to perform a retrieval operation, a restore operation, a disaster recover (DR) operation, and/or a purge (e.g., deletion) operation as will be illustrated in more details in FIG. 5.

FIG. 3 is a modular view of the access module 202 with a selector module 302 determining a task based on a signal data (e.g., a data and/or a meta-data) communicated through the capture module 116 of FIG. 1, according to one embodiment. The access module 202 includes the selector module 302, the VM creator module 304, the VM access module 306, and the policy module 308. In one example embodiment, the selector module 302 may receive the change of the data acquired in the capture module 116 of FIG. 1 and a command to back up the change of the data to the backup server storage 104. In this case, the selector module 302 may be used to access a virtual machine which may correspond to attributes (e.g., the application, the operating system, the file system, etc.) of the application server 106 using the VM access module 306. Then, the change of the data may be modified and/or copied to the backup server storage 104 using the journal module 208 of FIG. 2.

In another example embodiment, the selector module 302 may receive a meta-data (e.g., any descriptive item about data, such as a title field in a media file, a field of key words in a written article and/or a content in a meta tag in an HTML page) describing data and a command to perform a modification (e.g., retrieval, recovery, restore, and/or deletion) of the data. Here, the selector module 302 may be used to access a virtual machine which may correspond to the attributes (e.g., the application, the operating system, the file system, etc.) of the application server 106 using the VM access module 306. Then, the selector module 302 may be used to communicate (e.g., retrieve, restore, recover, and/or purge) the data back to the application server 106 using a sub-module (e.g., the retrieval module 502, the restore module 504, the DR module 506, and/or the delete module 508 of FIG. 5) of the modification module 210 of FIG. 2.

Furthermore, the selector module 302 may communicate (e.g., send and/or receive) a signal data to the VM creator module 304 when the selector module 302 detects an application server coupled to the network 100 of FIG. 1. Then, the VM creator module 304 may process the signal data to create a virtual machine mirroring (e.g., duplicating data onto another computer at another location for backup purposes) the attributes (e.g., the application, the operating system, the file system, etc.) of the application server 106. Next, the virtual machine may be stored using the VM library module 206, a software program/management tool which may used to backup the virtual machine (e.g., equipped with the attributes of the application server 106) to a specified storage space (e.g., a designated drive) of the backup server storage 104 of FIG. 1.

Figure 5:
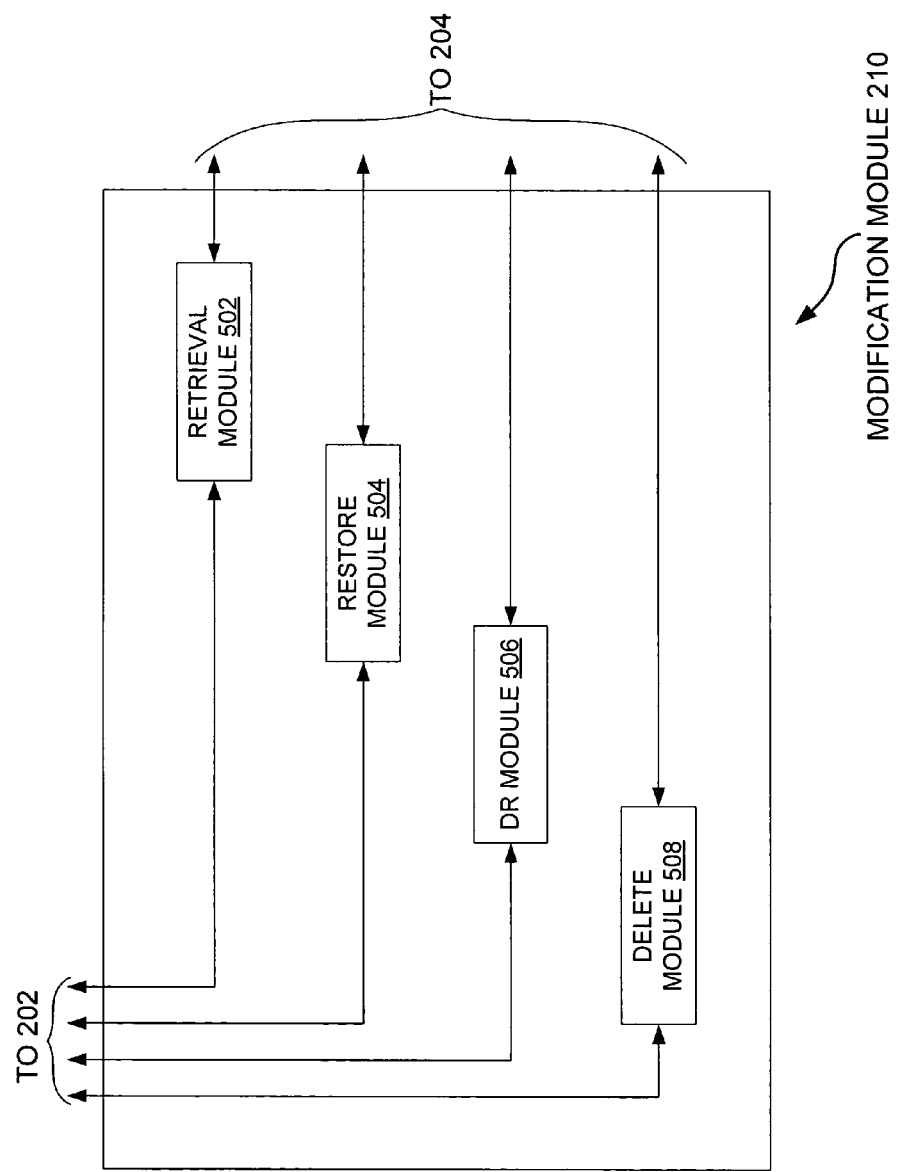
FIG. 5 is a modular diagram of the modification module of FIG. 2, according to one embodiment.

Moreover, the policy module 308 of the selector module 302 may generate a command data to purge data using the deletion module 508 of FIG. 5 described by a meta-data (e.g., which may be a part of the command data) when a signal data indicating that a period since a recent modification of the data exceeds a threshold value is communicated to the selector module 302. For instance, data that have not been modified for a long duration of time (e.g., 50 years) and/or are not required to keep due to other valid reasons (e.g., no legal requirement and/or business need) may be automatically purged (e.g., deleted) by setting an algorithm with a threshold value in the policy module 308. Accordingly, the virtual machine which corresponds only to the data but none other data stored in the backup server storage 104 may be purged from the VM module 204 and/or the VM library module 206 of FIG. 2 as a part of an effort to manage a backup operation of the backup server 102 and/or the backup server storage 104 in a more efficient manner.

FIG. 4 is a modular view of the VM module 204 of FIG. 2 having a VM manager 402, according to one embodiment. The FIG. 4 includes a hardware (e.g., of an application server, a backup server, etc.), a VM manager 402, a VM (virtual machine) 404, a OS (operating system) 406, an APP (application) 408, a CPU (central processing unit) 410, a memory 412, a NIC (network interface card) 414, and a disk 416. The VM module 204 may be a software program and/or a hardware (e.g., which may be modified based on a product existing in the market such as VM Ware® and Xen® and/or may be created in its entirety) to enable a virtualization of a machine (e.g., the application server 106, the backup server 102, etc.).

The virtualization may be a method of separating a resource for a service (e.g., an application) from a physical delivery of the service (e.g., an application server running the application). A key benefit of the virtualization may be an ability of running multiple applications (e.g., the APPs 408A-N) and/or multiple operating systems (e.g., the OS 406A-N) on a single physical system (e.g., a single application server) while sharing underlying hardware resources available in the single physical system. The VM manager 402 may be a software program that runs in a layer between the VM 404 and the hardware 400 to export (e.g., to create using the VM creator module 304 of FIG. 3 and the VM manager 402 and/or provide an access to the VM module 204 of FIG. 2 using the VM access module 306 and the VM module 204) a VM 404 identical to the attributes (e.g., the application, the operating system, the file system, etc.) of the application server 106 of FIG. 1.

Here, the VM 404 may be used to export (e.g., to create and/or provide an access) using a transparent virtualization which allows an operating system or a particular component of the operating system to run inside the VM 404 without any modification. In addition, the VM 404 may be exported using a para-virtualization which requires the operating system to be modified before it can run inside the VM 404. The CPU (central processing unit) 410, the memory 412, the NIC (network interface card) 414, and the disk 416 may be managed by the VM manager 402 so that they may be accessed by the VMs 404A-N.

FIG. 5 is a modular diagram of the modification module 210 of FIG. 2, according to one embodiment. The modification module 210 includes a retrieval module 502, the restore module 504, the disaster recovery (DR) module 506, and the delete module (508). The retrieval module 502 may be used to retrieve a past instance of data describe by a meta-data when the retrieval module 502 is trigged by the selector module 302 of FIG. 3 with the meta-data describing the data targeted for a retrieval operation. In one example embodiment, the meta-data may indicate files of Hotmail® messages from Smith to Mike between Jan. 1 of 1980 to Dec. 31 of 1982. Upon trigged by the selector module 302 with the meta-data, the retrieval module 502 may patch the data from the backup server storage 104 of FIG. 1 using a virtual machine (e.g., the VM 404 of FIG. 4) of the VM module 204 of FIG. 2 which matches attributes (e.g., the application, the operating system, the file system, etc.) of the application server 106 used in backing up the data.

The restore module 504 may be used to restore a past instance of the application server 106 of FIG. 1 describe by a meta-data when the restore module 504 is trigged by the selector module 302 of FIG. 3 with the meta-data describing the application server and a time stamp of the past instance. In one example embodiment, the meta-data may contain the application server 106 with a particular network IP address (e.g., the address of the application server 106 attached to an IP network) and the time stamp denoting "5:15 pm of Dec. 25, 2005." Upon trigged by the selector module 302 with the meta-data, the restore module 504 may patch a version of system configurations (e.g., attributes and/or other data) of the application server 106 stored in the backup server storage 104 of FIG. 1 up until 5:15 pm of Dec. 25, 2005 using a virtual machine (e.g., the VM 404 of FIG. 4) of the VM module 204 and/or the VM library module 206 of FIG. 2. Thus, the restore module 504 may allow the application server 106 to return to a state (e.g. system configurations) of the application server 106 before there was any corruption (e.g., pf the data and/or the system due to a virus, incorrigible error, etc.).

The DR module 506 may be used to automatically recover recent (e.g., most recent) attributes and/or data of the application server 106 when the DR module 506 is trigged by the selector module 302 of FIG. 3. In one example embodiment, the DR module 506 may be triggered by the selector module 302 when the application server 106 is inactive (e.g., down). Upon trigged by the selector module 302, the DR module 506 may patch a recent (e.g., most updated) copy of the attributes (e.g., the application, the operating system, the file system, etc.) and/or data of the application server 106 from the backup server storage 104 of FIG. 1 using a virtual machine (e.g., the VM 404 of FIG. 4) of the VM module 204 and/or the VM library module 206 of FIG. 2.

The delete module 508 may be used to purge (e.g., delete) data described by a meta-data when the delete module 508 is trigged by the selector module 302 of FIG. 3 with the meta-data describing the data targeted for a delete operation. In one example embodiment, the meta-data may indicate files of Hotmail® messages from Smith to Mike between Jan. 1 of 1980 to Dec. 31 of 1982. Upon trigged by the selector module 302 with the meta-data, the delete module 508 may delete the data from the backup server storage 104 of FIG. 1 using a virtual machine (e.g., the VM 404 of FIG. 4) of the VM module 204 of FIG. 2 which matches attributes (e.g., the application, the operating system, the file system, etc.) of the application server 106 used in backing up the data.

In another example embodiment, the delete module 508 may be used to purge (e.g., delete) data described by a different type of meta-data (e.g., type of file, topic, author, or similar meta-data). In both example embodiments, the policy module 308 of FIG. 3 may generate a sensory data (e.g., visual, auditory, etc.) to warn any possible breach of legal requirement (e.g., Sarbanes-Oxley which requires public companies and their public accounting firms to retain records, including electronic records that impact the company's assets or performance) before the delete module 508 is in effect.

FIG. 6 is a block diagram of a backup server 602 having a plurality of virtual machines 610 connected to a plurality of application servers 606, according to one embodiment. The application server 606A may be based on a physical machine (e.g., a PM 608A) with an application (e.g., an APP-1) and an operating system (e.g., an OS-1). The application server 606B may be based on two virtual machines (e.g., a VM 608B and a VM 608C) each virtual machine having a unique application and operating system (e.g., an APP-2 and an OS-2 for the VM 608B and an APP-3 and OS-3 for the VM 608C).

Here, the application server 606B may be able to better utilize an operating capability (e.g., such as operating an APP-3 while an APP-2 is not being used) of the application server 606B. The application server 606N may be based on a single virtual machine (e.g., a VM 608N) having an application (e.g., an APP-N) and an operating system (e.g., an OS-N). More virtual machines may be added to the application server 606N.

The backup server 602 may include a VM 610A, a VM 610B, a VM 610C, and a VM 61 ON. The VM 610A may be a replication of the PM 608A of the application server 606A created by the VM module 204 of FIG. 2. The VM 610B and the VM 610C may be a replication of the VM 608B and a replication of the VM 608C of the application server 606B respectively created by the VM module 204. Likewise, the VM 610N may be a replication of the VM 608N of the application server 606N.

In one example embodiment, a virtual machine (e.g., the VM 610) mirroring a physical machine (e.g., the PM 608A) and/or a virtual machine (e.g., the VMs 608B-N) of the application server 606 may be created (e.g., at least once) in the backup server 602 (e.g., the backup module 118 of FIG. 1) using the VM creator module 304 of FIG. 3 and the VM module 204 of FIG. 2 when the application server 606 is connected to the backup server 602 through the network 100. The virtual machine (e.g., the VM 610) may be maintained and/or accessed through the VM access module 306 of FIG. 3 and/or the VM module 204 of FIG. 2. In addition, attributes (e.g., the application, the operating system, the file system, etc.) of the virtual machine (e.g., the VM 610) may be stored in the VM library module 206 of FIG. 2 and the VM module 204 of FIG. 2.

The virtual machine (e.g., the VM 610) of the backup server 602 may be purged from the backup server 602 using the delete module 508 of FIG. 5 when the policy module 308 of FIG. 3 does not raise any flag (e.g., an age of data about to be purged is less than a threshold value set in the policy module 308).

Figure 7:
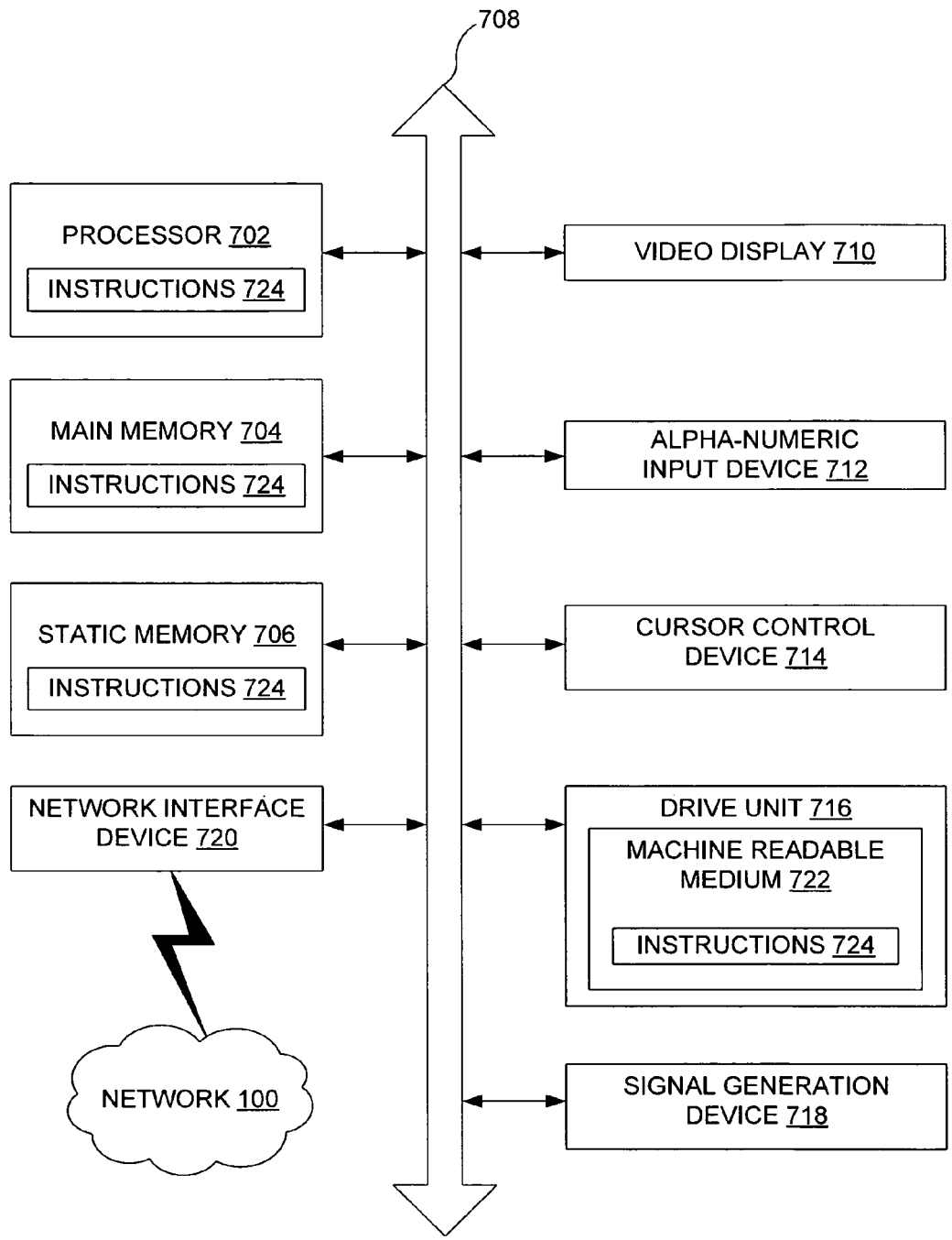
FIG. 7 is a diagrammatic representation of the data processing system of FIG. 1 capable of processing a set of instructions to perform any one or more of methodologies described herein, according to one embodiment.

FIG. 7 is a diagrammatic representation of the data processing system 114 of FIG. 1 capable of processing (e.g., to initiate, communicate, etc.) a set of instructions to perform any one or more of methodologies described herein, according to one embodiment. In various embodiments, the data processing system 114 operates as a standalone device and/or may be connected (e.g., networked through the network 100) to other machines. In a network deployment, the data processing system 114 may operate as a workstation (e.g., to provide a graphic user interface) which connects to the application server 106 and the backup server 102 of FIG. 1. The data processing system 114 may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system 114 may include a processor 702 (e.g., a central processing unit (CPU) or the CPU and a graphics processing unit (GPU)), a main memory 704, and a static memory 706, which communicate to each other via a bus 708. The data processing system 114 may further include a video display unit 710 (e.g., a liquid crystal display (LCD) and/or a cathode ray tube (CRT)), an alpha-numeric input device 712 (e.g., a keyboard), a cursor control device 714 (e.g., a mouse), a drive unit 716, a signal generation device 718 (e.g., a speaker), and a network interface device 720.

The drive unit 716 may include a machine-readable medium 724 on which is stored one or more sets of instructions (e.g., instructions 722) embodying any one or more of the methodologies and/or functions described herein. The instruction 722 may also reside, completely and/or at least partially, within the main memory 704 and/or within the processor 702 during the execution thereof by the data processing system 114, wherein the main memory 704 and the processor 702 may also constitute machine-readable media.

The instruction 722 may further be transmitted and/or received over the network 100 via the network interface device 720. While the machine-readable medium 724 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media.

Figure 8:
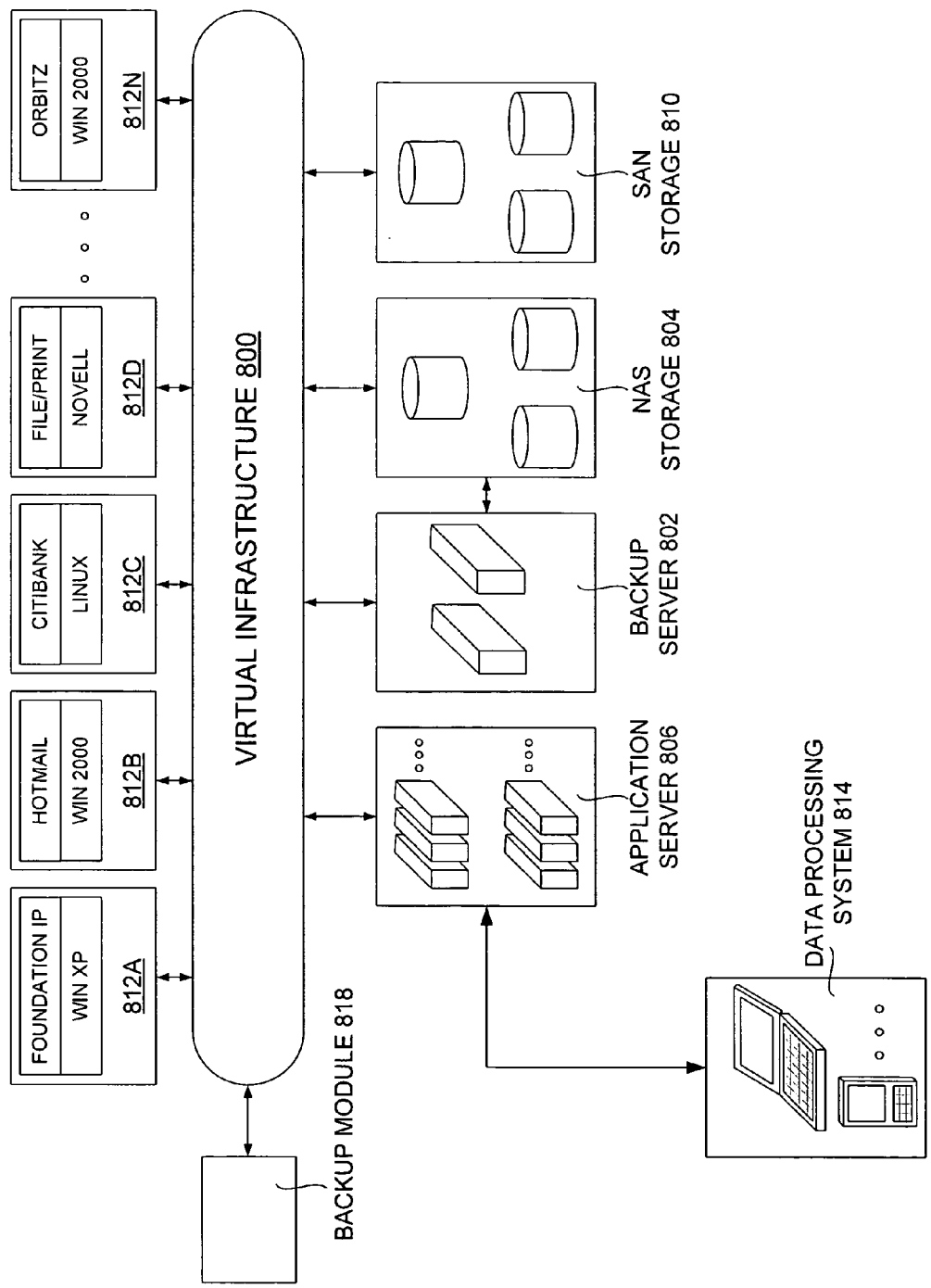
FIG. 8 is a conceptual diagram of a virtual infrastructure which allows the application server and the backup server an access to a virtual machine, according to one embodiment.

FIG. 8 is a conceptual diagram of a virtual infrastructure 800 which allows the application server 806 and the backup server 802 an access to a virtual machine 812, according to one embodiment. FIG. 8 includes the virtual infrastructure 800, the backup server 802, a network-attached storage (NAS) 804, the application server 806, a SAN storage 810, the virtual machines 812, a data processing system 814, and a backup module 818. The virtual infrastructure 800 (e.g., a set of interconnected structural elements that may provide a framework for the entire structure using a virtual machine technology) may be created, managed, and/or purged by the backup module 818 (e.g., which may be a software algorithm and/or a hardware algorithm).

When the virtual machine 812 is created by the backup module 818 mirroring (e.g., replicating) the application server 806, the virtual machine 812 becomes accessible regardless of a state of the application server 806. Accordingly, the virtual machine 812 may be available to retrieve, recover, restore, and/or delete data in spite of an unavailability (e.g., due to a failure and/or removal) of the application server 806 which participated in backing up the data at an earlier point in time. The backup module 818 may also be used to manage the virtual infrastructure 800 through providing an access to the virtual machine 812 when the access is requested (e.g., processed) by the application server 806.

In one example embodiment, a request for the access may be communicated (e.g., initiated, triggered, etc.) from the data processing system 814 when a user logs on to the application server 806 to use an application (e.g., a Citibank® online bank) to withdraw some money from the user's account. Upon being requested by the user of the withdrawal, information about the withdrawal (e.g., and/or other transactions) may be captured at the application server 806 and/or the backup server 802, communicated, and/or backed up to the NAS 804 (e.g., which may enable multiple computers to share a same storage space at once minimizing overhead by centrally managing hard disks) using the virtual machine 812 to have an access to attributes (e.g., an application and/or an operating system) of the virtual machine 812C which corresponds to the attributes of the application server 806. A capture of the information about the withdrawal (e.g., and/or other transactions) may also take place at an array controller of the SAN storage 810, communicated, and/or backed up to the NAS 804.

In another example embodiment, a recent attribute and/or data of the application server 806 may be recovered using the virtual machine 812C when the application server 806 fails (e.g., thereby downing the Citibank® online bank). Here, the backup module 818 may automatically initiate a recovery of the recent attributes (e.g., the Citibank® online bank and/or Linux® operating system) and/or data (e.g., the user's account information). In addition, other modification operations (e.g., a retrieval operation, a restore operation, and/or a delete operation) associated with the attributes of the application server 806 and data processed through the application server 806 may be performed using the virtual machine 812.

Figure 9:
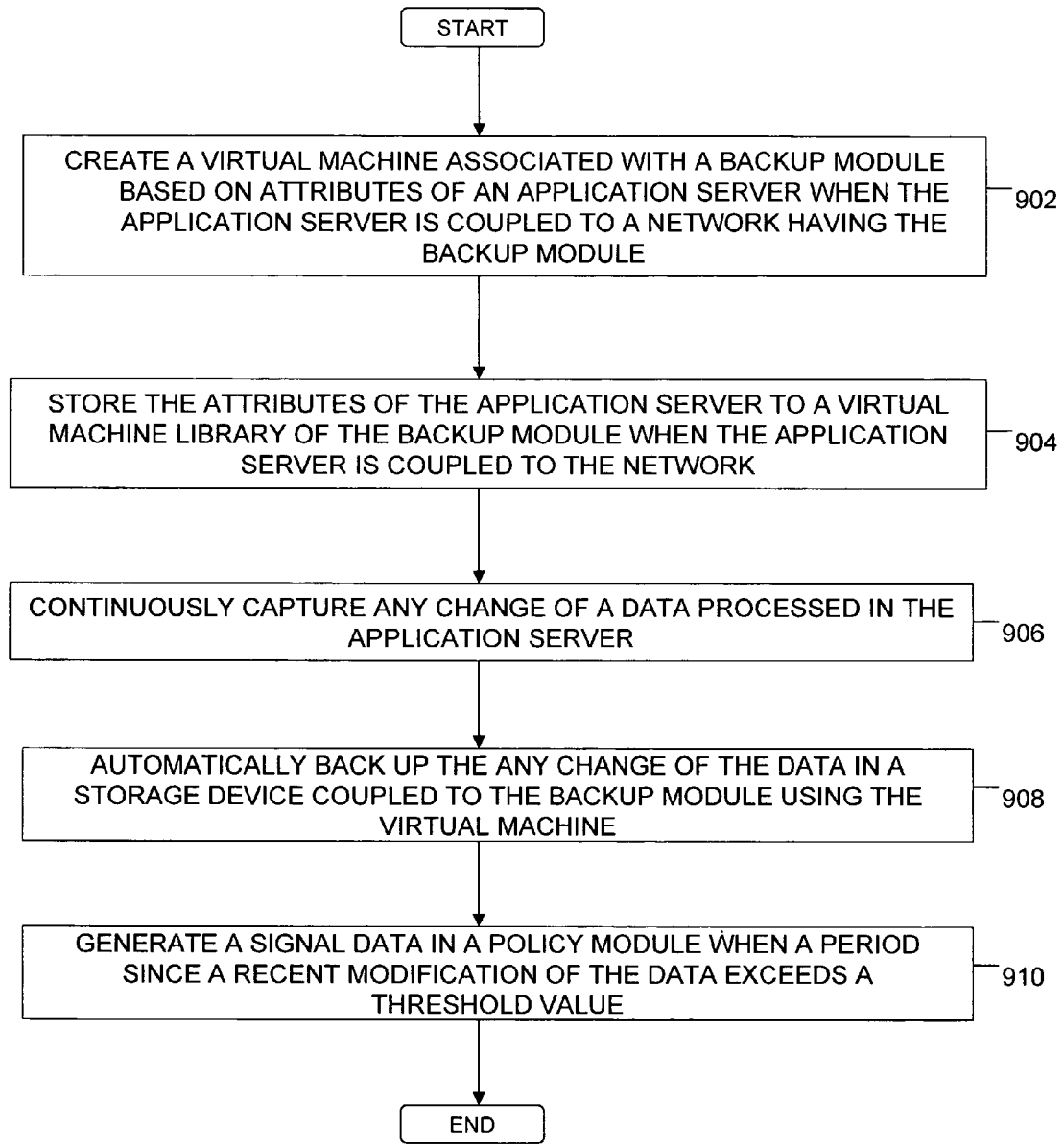
FIG. 9 is a process flow of backing up any change of data using a virtual machine associated with the backup module of FIG. 1, according to one embodiment.

FIG. 9 is a process flow of backing up any change of data using a virtual machine associated with the backup module 118 of FIG. 1, according to one embodiment. In operation 902, a virtual machine associated with a backup module (e.g., the backup module 118 of FIG. 1) may be created based on attributes of an application server (e.g., the application server 106) when the application server is connected to a network (e.g., the network 100) having the backup module. The attributes (e.g., an application, an operating system, a file system, etc.) of the application server may be stored in operation 904 to a virtual machine library (e.g., the VM library module 206 of FIG. 2) of the backup module when the application server is connected to the network (e.g., the network 100 of FIG. 1).

In operation 906, any change of a data may be continuously captured (e.g., acquired) in the application server (e.g., the backup server 102 and/or the controller 112 of the SAN storage 110). Then in operation 908, the any change of the data may be automatically backed up (e.g., copied) in a storage device (e.g., the backup server storage 104 of FIG. 1) coupled to the backup module using the virtual machine and/or directly through the backup device. Next in operation 910, a signal data (e.g., informing a possible obsolescence of the data) may be generated in a policy module (e.g., the policy module 308 of FIG. 3) when a period since a recent modification of the data exceeds a threshold value.

Figure 10:
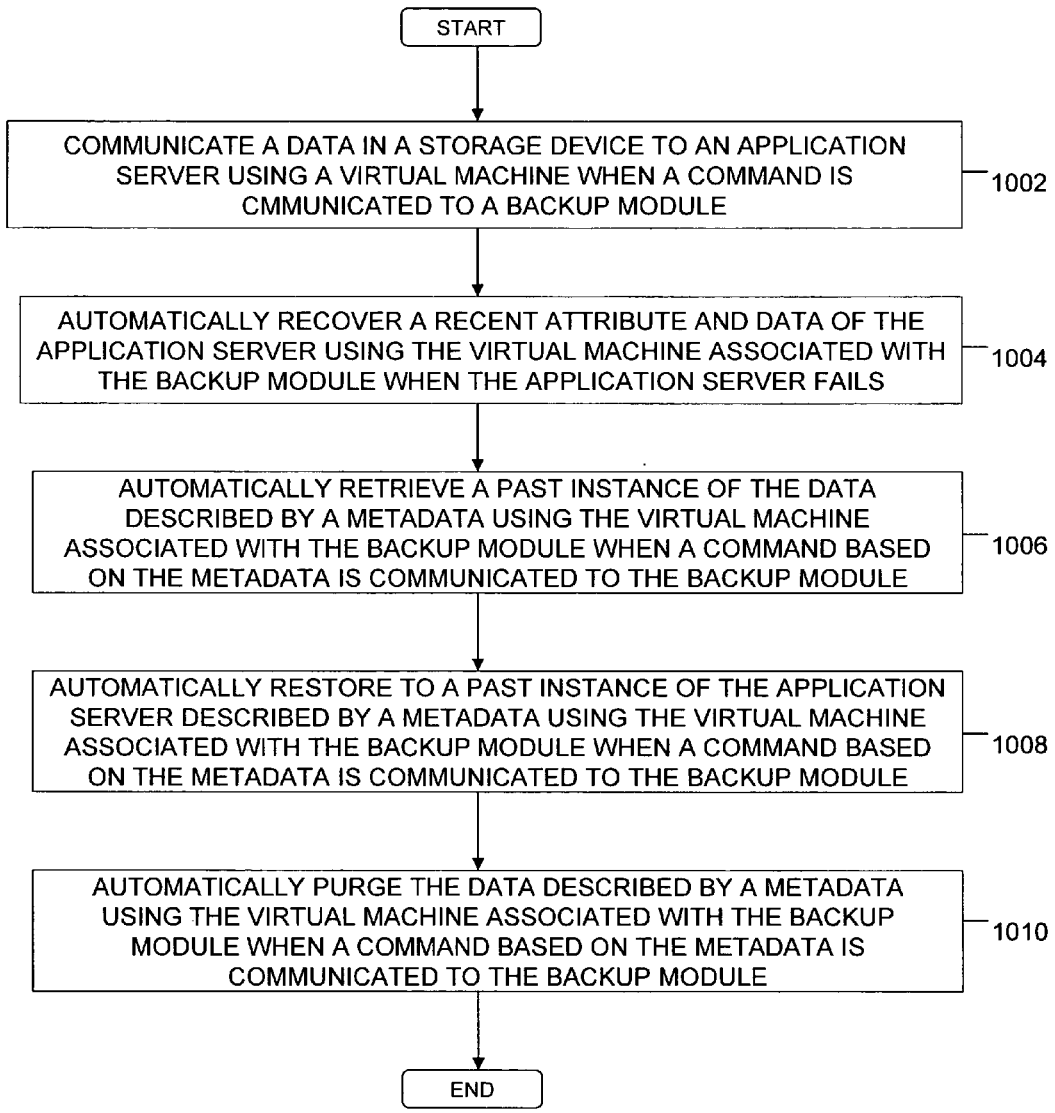
FIG. 10 is a process flow of modifying data and attributes associated with the application server of FIG. 1 using a virtual machine associated with the backup module, according to one embodiment.

FIG. 10 is a process flow of modifying data and attributes associated with the application server 106 of FIG. 1 using a virtual machine associated with the backup module 118 of FIG. 1, according to one embodiment. In operation 1002, a data in a storage device may be communicated to an application server (e.g., the application server 106 of FIG. 1) using a virtual machine when a command (e.g., to retrieve, recover, restore, and/or delete) is communicated to a backup module (e.g., the backup module 118). A recent attribute (e.g., an application, an operating system, a file system, etc.) and data of the application server may be automatically recovered in operation 1004 using the virtual machine associated with the backup module when the application server fails.

Then in operation 1006 a past instance of the data described by a meta-data (e.g., of the data targeted for a retrieval operation) may be automatically retrieved using the virtual machine associated with the backup module when a command based on the meta-data is communicated to the backup module. In operation 1008, a past instance of the application server described by a meta-data (e.g., describing the application server 106 and a time stamp of the past instance) may be automatically restored (e.g., to the application server 106 of FIG. 1) using the virtual machine associated with the backup module when a command based on the meta-data is communicated to the backup module. The data described by the meta-data (e.g., describing type of file, topic, author, and/or similar meta-data) may be automatically purged (e.g., deleted) in operation 1010 using the virtual machine associated with the backup module when a command based on the meta-data is communicated to the backup module.

Although the present embodiments have been described with reference to specific example embodiments, it will be evident that various modifications and changes may be made to these embodiments without departing from the broader spirit and scope of the various embodiments. For example, the capture module 116 and the backup module 118 of FIG. 1, the access module 202, the VM module 204, the VM library module 206, the journal module 208, and the modification module 210 of FIG. 2, the selector module 302, the VM creator module 304, the VM access module 306, and the policy module 308 of FIG. 3, the retrieval module 502, the restore module 504, the DR module 506, and the delete module 508 of FIG. 5, described herein may be enabled and operated using hardware circuitry (e.g., CMOS based logic circuitry), firmware, software and/or any combination of hardware, firmware, and/or software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   mirroring an application and an operating system executing on an application server in a virtual machine created on a backup server coupled to the application server through a network;
   continuously capturing a change of data processed in the application server at a time of occurrence thereof and automatically backing up the change of the data in a storage device coupled to the backup server;

communicating, to the application server, appropriate backed up data in accordance with a command communicated to the backup server based on accessing the virtual machine in which the application and the operating system executing on the application server are mirrored, wherein the backed up data are automatically purged by setting an algorithm with a threshold value, and wherein sensory data are generated to warn of any possible breach of legal requirement before the data are purged.

2. The method of claim 1, further comprising mirroring a file system implemented in the application server in the virtual machine.

3. The method of claim 1,
wherein the change of the data comprises one of a first instance of the data and a subsequent change to the data, and
wherein automatically backing up the change of the data in the storage device includes at least one of: using the virtual machine and directly backing up through the backup server.

4. The method of claim 1, further comprising modifying the change of the data to a form associated with the virtual machine before automatically backing up the change of the data in the storage device.

5. The method of claim 1, further comprising performing the capturing of the change of the data in at least one of the application server, a controller of a storage subsystem coupled to the application server, and the backup server coupled to the network.

6. The method of claim 1, further comprising automatically recovering a recent attribute and data of the application server using the virtual machine associated with the backup server when the application server fails.

7. The method of claim 1, further comprising automatically retrieving a past instance of the data described by a meta-data using the virtual machine associated with the backup server when a command based on the meta-data is communicated to the backup server.

8. The method of claim 1, further comprising automatically restoring to a past instance of the application server described by a meta-data using the virtual machine associated with the backup server when a command based on the metadata is communicated to the backup server.

9. The method of claim 1, further comprising automatically purging the data described by a meta-data using the virtual machine associated with the backup server when a command based on the meta-data is communicated to the backup server.

10. The method of claim 1, further comprising storing attributes of the application server to a virtual machine library of the backup server.

11. The method of claim 1, further comprising:
generating a signal data in the backup server to indicate that a period since a recent modification of the data exceeds a threshold value thereof; and
purging the data from the backup server based on the indication received through the signal data.

12. The method of claim 1, wherein the application server executes a plurality of applications and operating systems based on a plurality of virtual machines.

13. A non-transitory storage medium, readable through at least one of an application server coupled to a backup server through a network and the backup server and embodying a set of instructions therein configured to be executable on the at least one of the application server and the backup server, comprising instructions associated with:

mirroring an application and an operating system executing on the application server in a virtual machine created on the backup server continuously capturing a change of data processed in the application server at a time of occurrence thereof and automatically backing up the change of the data in a storage device coupled to the backup server;

communicating, to the application server, appropriate backed up data in accordance with a command communicated to the backup server based on accessing the virtual machine in which the application and the operating system executing on the application server are mirrored, wherein the backed up data are automatically purged by setting an algorithm with a threshold value, and wherein sensory data are generated to warn of any possible breach of legal requirement before the data are purged.

14. A network system of servers, comprising:
an application server;
a network; and
a backup server coupled to the application server through the network, the backup server having an appropriate module resident thereon to create a virtual machine thereon in which an application and an operating system executing on the application server are mirrored;
a capture module resident on at least one of the application server, the backup server and an optional storage device associated with the network to continuously capture a change of data processed in the application server at a time of occurrence thereof;
a storage device coupled to the backup server to automatically backup the captured change of the data processed in the application server, and to communicate, to the application server, appropriate backed up data in accordance with a command communicated thereto based on accessing the virtual machine in which the application and the operating system executing on the application server are mirrored,
wherein the backed up data are automatically purged by setting an algorithm with a threshold value, and
wherein sensory data are generated to warn of any possible breach of legal requirement before the data are purged.

15. The network system of claim 14, wherein the application server executes a plurality of applications and operating systems based on a plurality of virtual machines.

16. A backup server, comprising:
a virtual machine creator module configured to execute on a processor of the backup server communicatively coupled to a memory to create a virtual machine on the backup server mirroring an application and an operating system executing on an application server coupled to the backup server through a network;
a storage device coupled to the backup server to receive a change of data processed in the application server that is continuously captured at at least one of the backup server, the application server and an external storage device at a time of occurrence thereof, to automatically backup the change of data, and to communicate, to the application server, appropriate backed up data in accordance with a command communicated thereto based on accessing the virtual machine in which the application and the operating system executing on the application server are mirrored,
wherein the backed up data are automatically purged by setting an algorithm with a threshold value, and
wherein sensory data are generated to warn of any possible breach of legal requirement before the data are purged.

17. The backup server of claim 16, further comprising a modification module configured to execute on the processor to perform at least one of a retrieval operation, a restore operation, a disaster recovery operation, and a deletion operation associated with the data and the application server.

18. The backup server of claim 16, wherein the virtual machine creator module is further configured to mirror a plurality of applications and operating systems executing on the application server in a plurality of virtual machines.

19. The backup server of claim 16, further comprising a disaster recovery module configured to execute on the processor to automatically recover the application and the operating system of the application server when the application server is shut down.

20. The backup server of claim 16, wherein the virtual machine creator module is further configured to mirror a file system implemented in the application server in the virtual machine.

* * * * *